US010166692B2

(12) United States Patent
Frolov

(10) Patent No.: US 10,166,692 B2
(45) Date of Patent: Jan. 1, 2019

(54) PRECISION ADJUSTABLE MITER GAUGE FOR A TABLE SAW

(71) Applicants: Robert Bosch Tool Corporation, Broadview, IL (US); Robert Bosch GmbH, Stuttgart (DE)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 78 days.

(21) Appl. No.: 15/228,349

(22) Filed: Aug. 4, 2016

(65) Prior Publication Data

US 2018/0036905 A1 Feb. 8, 2018

(51) Int. Cl.

| | |
|---|---|
| ***B23D 15/00*** | (2006.01) |
| ***B23D 17/00*** | (2006.01) |
| ***B23D 19/00*** | (2006.01) |
| ***B26D 7/06*** | (2006.01) |
| ***B27G 5/02*** | (2006.01) |
| ***B27B 5/22*** | (2006.01) |
| ***B27B 25/10*** | (2006.01) |

(52) U.S. Cl.

CPC .............. *B27G 5/023* (2013.01); *B27B 5/222* (2013.01); *B27B 25/10* (2013.01)

(58) Field of Classification Search

CPC .......... B27B 25/10; B27G 5/023; B27G 5/222

USPC ....................................................... 83/435.12

See application file for complete search history.

(56) References Cited

U.S. PATENT DOCUMENTS

| | | | | |
|---|---|---|---|---|
| 503,726 A | | 8/1893 | Pryibil | |
| 2,685,824 A | * | 8/1954 | Coop | B23Q 3/069 269/317 |
| 3,941,038 A | * | 3/1976 | Bishop | B26D 7/2614 493/371 |
| 5,029,505 A | * | 7/1991 | Holliday | B26D 7/2614 76/107.8 |

(Continued)

FOREIGN PATENT DOCUMENTS

CA 2177640 A1 8/1997

OTHER PUBLICATIONS

International Search Report corresponding to PCT Application No. PCT/EP2017/069776 (6 pages).

*Primary Examiner* — Ghassem Alie
*Assistant Examiner* — Bharat C Patel
(74) *Attorney, Agent, or Firm* — Maginot Moore & Beck LLP

(57) ABSTRACT

An adjustable miter gauge for use with a table saw includes a miter attachment and an adjustable guide bar coupled to the miter attachment. The miter attachment rests on a working surface of the table saw. The guide bar is received in a slot in the working surface. The guide bar includes a main body, which has first and second surfaces parallel to side walls of the slot, an adjustable body, which has a third surface parallel to the first surface, and a deformable biasing member. The adjustable body is coupled to the main body and slidable between a first position, wherein the second and third edge surfaces are coplanar, and a second position, wherein the second and third edge surfaces are not coplanar. The biasing member is arranged between the main body and the adjustable body and biases the adjustable body toward the second position.

20 Claims, 7 Drawing Sheets

(56) References Cited

U.S. PATENT DOCUMENTS

| | | | | | |
|---|---|---|---|---|---|
| 5,097,601 | A * | 3/1992 | Pollak | B23Q 1/262 | 33/469 |
| 5,379,669 | A * | 1/1995 | Roedig | B23Q 3/007 | 33/536 |
| 5,402,581 | A * | 4/1995 | Hurd | B23Q 3/005 | 33/471 |
| 5,735,054 | A * | 4/1998 | Cole | B23D 59/002 | 33/471 |
| 6,079,701 | A * | 6/2000 | Corle | C03B 33/03 | 225/96.5 |
| 6,237,457 | B1 * | 5/2001 | Taylor | B23D 47/02 | 411/544 |
| 6,502,492 | B1 * | 1/2003 | Krohmer | B27B 25/10 | 33/471 |
| 6,665,946 | B1 | 12/2003 | Reilly | | |
| 6,672,190 | B2 * | 1/2004 | Taylor | B27B 25/10 | 33/469 |
| 6,691,423 | B2 * | 2/2004 | Fontaine | B23Q 16/06 | 33/471 |
| 7,997,313 | B2 * | 8/2011 | Wang | B23Q 1/262 | 144/286.1 |
| 2002/0189121 | A1 | 12/2002 | Fontaine | | |
| 2006/0201298 | A1 * | 9/2006 | Smith | B27B 25/10 | 83/468 |

* cited by examiner

PRECISION ADJUSTABLE MITER GAUGE FOR A TABLE SAW

FIELD

This application relates to the field of miter gauges for table saws and, particularly to adjustable miter gauges for table saws.

BACKGROUND

In materials processes, for example making a cut in wood or a similar material, it is important to be able to precisely control the relative movement of the workpiece and the saw blade to ensure that the resulting cut is formed with the desired dimensions. However, precisely controlling the relative movement of the workpiece and the saw blade can be challenging when making, for example, irregularly shaped, curved, and angled cuts. Thus, guiding surfaces have been developed which can be firmly yet movably attached to cutting devices to provide a stable surface to guide the relative movement of the workpiece and the saw blade during the cutting process.

In particular, miter gauges have been developed to guide workpieces when angled cuts are made with a table saw. As shown in FIG. 1, a table saw 10 includes a saw blade 12 and a table top 14 having a slot 18 formed in a work surface 20 and the table top 14. The table saw 10 also includes a miter gauge 22, which includes a miter attachment 26 and a miter bar 30. The miter bar 30 is slidingly received in the slot 18 to slidably couple the miter gauge 22 to the table top 14. When the table saw 10 is used to perform a cutting operation that does not require the miter gauge 22, the miter gauge 22 can be removed from the table top 14 by sliding the miter bar 30 completely out of the slot 18. The miter attachment 26 is rotatably coupled to the miter bar 30 and has a planar miter surface 34, which provides a stable guiding surface to the workpiece. The miter surface 34 is not visible in FIG. 1, but its location is indicated by an arrow. Thus, because the miter bar 30 is rotationally fixed relative to the work surface 20 by the slot 18, rotationally adjusting the miter attachment 26 on the miter bar 30 sets an angle of the miter surface 34, and thus of the workpiece supported by the miter surface 34, relative to the saw blade 12.

As shown in FIG. 2, the slot 18 formed in the work surface 20 and the table top 14 has a "t" shape, including a main opening 38 and an engagement opening 42. The main opening 38 includes a first wall 46 and a second wall 50, which are formed opposite and facing toward one another. The first and second walls 46, 50 are spaced apart from one another by a first distance D1. The first and second walls 46, 50 are formed perpendicularly to the work surface 20, such that, as shown in FIG. 2, they are vertical. The engagement opening 42 is formed within the main opening 38 and includes a third wall 54 and a fourth wall 58, which are opposite and facing toward one another. The third and fourth walls 54, 58 are parallel to the first and second walls 46, 50 such that the third and fourth walls 54, 58 are also vertical. The third and fourth walls 54, 58 are spaced apart from one another by a second distance D2, which is larger than the first distance D1. Thus, the engagement opening 42 is formed as a wider cut-out in the main opening 38. The slot 18 further includes a fifth wall 62, which is formed between the first wall 46 and the third wall 54, and a sixth wall 66, which is formed between the second wall 50 and the fourth wall 58. The fifth and sixth walls 62, 66 are perpendicular to the first, second, third, and fourth walls 46, 50, 54, 58 such that the fifth and sixth walls 62, 66 are horizontal.

As shown in FIG. 3, the miter bar 30 is generally matingly shaped to slide within the slot 18. The miter bar 30 includes a main portion 70, configured to slide between the first and second walls 46, 50, and an engagement portion 74, configured to slide between the third and fourth walls 54, 58. Accordingly, the main portion 70 has a first width W1, which is smaller than the distance D1 (shown in FIG. 2), and the engagement portion 74 has a second width W2, which is larger than the first distance D1 and smaller than the second distance D2 (shown in FIG. 2). Thus, the engagement portion 74 of the miter bar 30 engages within the engagement opening 42 of the slot 18 and prevents the miter bar 30 from being lifted out of the slot 18 in a direction perpendicular to the work surface 20.

Often, miter gauges 22 are a separate accessory to the table saw 10 and are configured to be repeatedly insertable and removable, as needed, from the table saw 10. Accordingly, the relative dimensions of the miter bar 30 and the slot 18 must be sized so as to allow the miter gauge to slide smoothly. Furthermore, the slots 18 formed in different table saws 10 may not have the same first and second distances D1, D2. Accordingly, the main portion 70 and the engagement portion 74 must be sized so as to fit within slots 18 having some dimensional variation. Finally, each of the slot 18 and the miter bar 30 will be produced having dimensions within manufacturing tolerances. Accordingly, each slot 18 and each miter bar 30 will have unique dimensions, and the slot 18 and the miter bar 30 must be sized to accommodate the manufacturing tolerances of the matingly formed part.

As shown in FIG. 3, due to the aforementioned size requirements and variations of the slot 18 and miter bar 30, gaps 78 may be present between the main portion 70 of the miter bar 30 and the main opening 38 of the slot 18. These gaps 78 prevent the miter bar 30 from resting firmly against the first and second walls 46, 50 of the slot 18. Thus, when pressure is applied on a workpiece guided by the miter surface 34, the pressure is transferred through the miter attachment 26 and into the miter bar 30, and the miter bar 30 is moved within the slot 18 until the main portion 70 contacts one of the first and second walls 46, 50 of the slot 18. This movement of the miter bar 30 prevents cuts from being precisely formed in the workpiece, because it prevents the position of the miter gauge 22, and thus the position of the workpiece, from being precisely controlled relative to the saw blade 12.

In view of the foregoing, it is apparent that there is a need for an adjustable miter gauge for table saws, which can prevent unwanted movement of the miter bar within the slot. There is also a need for an adjustable miter gauge for table saws, which can be adjusted to the dimensions of various slots. There is also a need for an adjustable miter gauge for table saws which enables easy adjustment of the width of the miter bar.

SUMMARY

In one preferred embodiment of the present disclosure, an adjustable guide for a miter gauge is configured to be received in a slot formed in a working surface of a table saw. The slot has a first side wall and a second side wall arranged opposite and parallel to one another. The guide includes a main body having a first edge surface extending substantially parallel to the first and second side walls when the adjustable guide is received in the slot. The guide further includes an adjustable body having a second edge surface extending substantially parallel to the first edge surface. The adjustable body is slidably coupled to the main body so as to be slidable between a first position and a second position. In the first position, the second edge surface is substantially coplanar with the first edge surface. In the second position, the second edge surface is not substantially coplanar with the first edge surface. The guide further includes a deformable biasing member arranged between the main body and the adjustable body and configured to bias the adjustable body toward the second position.

In another preferred embodiment of the present disclosure, an adjustable miter gauge is configured for use with a table saw. The table saw has a working surface and a slot formed in the working surface. The slot has a first side wall and a second side wall arranged opposite one another. The adjustable miter gauge includes a miter attachment having a substantially planar support surface configured to rest on the working surface of the table saw. The adjustable miter gauge further includes an adjustable guide bar rotatably coupled to the support surface of the miter attachment and configured to be received in the slot formed in the working surface of the table saw. The adjustable guide bar includes a main body having a first edge surface and a second edge surface arranged opposite one another and substantially perpendicular to the support surface. The adjustable guide bar further includes an adjustable body having a third edge surface extending substantially parallel to the first and second edge surfaces. The adjustable body is slidably coupled to the main body so as to be slidable between a first position and a second position. In the first position, the third edge surface is substantially coplanar with the second edge surface. In the second position, the third edge surface is not substantially coplanar with the second edge surface. The adjustable guide bar further includes a deformable biasing member arranged between the main body and the adjustable body and configured to bias the adjustable body toward the second position.

DETAILED DESCRIPTION

Figure 4:
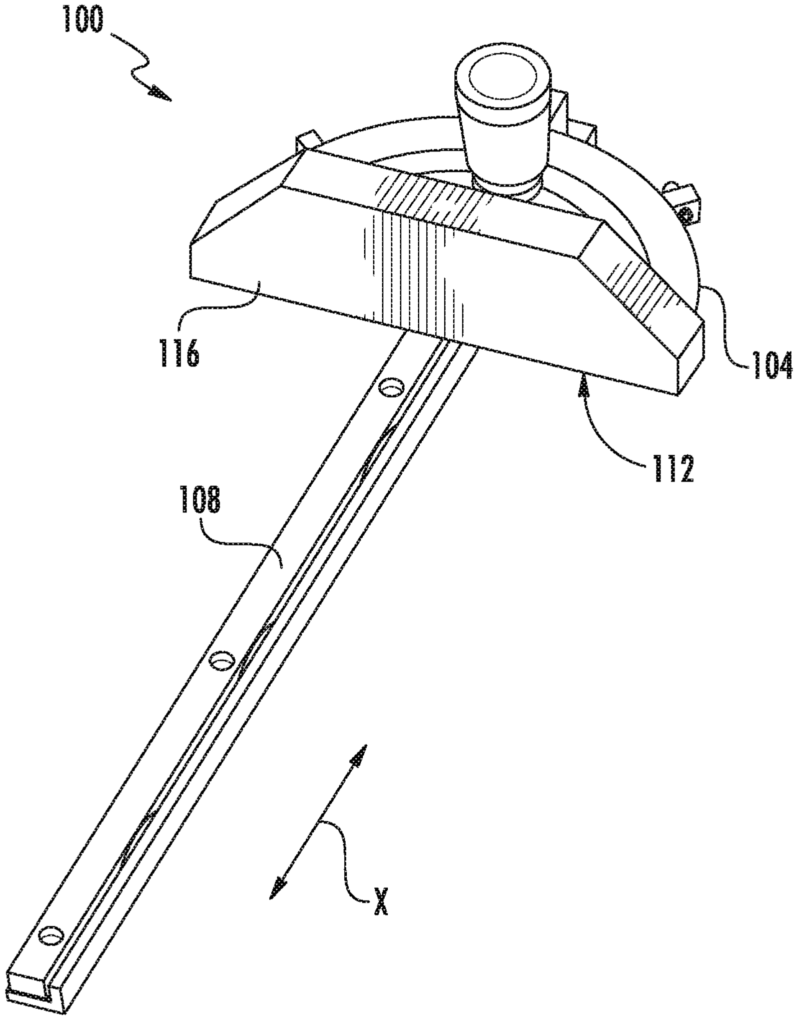
FIG. 4 depicts a perspective view of a preferred embodiment of an adjustable miter gauge including a miter attachment and a miter bar and configured for use with the table saw shown in FIG. 1.

FIG. 4 depicts an adjustable miter gauge 100, according to the present disclosure, which is configured for use in a table saw, such as the table saw 10 described above and shown in FIG. 1. The miter gauge 100 includes a miter attachment 104 and a miter bar 108. The miter attachment 104 is rotatably adjustably mounted to the miter bar 108, which is configured, as described in more detail below, to be received in the slot 18, shown in FIGS. 1 and 2. The miter bar 108 is selectively adjustable between a first position and a second position to engage the first and second walls 46, 50 of the slot 18 when received therein.

The miter attachment 104 includes a support surface 112, which is configured to rest on the work surface 20 of the table top 14 (shown in FIG. 1), and a miter surface 116, which is configured to provide a stable, planar surface against which a workpiece may be guided. The support surface 112 is not visible in FIG. 4, but its location is indicated by an arrow. Each of the support surface 112 and the miter surface 116 is substantially planar, and the miter surface 116 is arranged substantially perpendicularly to the support surface 112 such that the miter surface 116 extends above the table top 14 when the support surface 112 is resting on the work surface 20 (shown in FIG. 1). As described in more detail below, the miter attachment 104 is rotatable relative to the miter bar 108 to adjust an angle of the miter surface 116 relative to the saw blade 12 (shown in FIG. 1).

The miter bar 108 extends a length L1 (shown in FIG. 5) in a longitudinal direction X. When the miter bar 108 is received within the slot 18, the longitudinal direction X is parallel to the saw blade 12 (shown in FIG. 1). Thus, rotationally adjusting the angle of the miter surface 116 relative to the longitudinal direction X of the miter bar 108 adjusts the angle of the miter surface 116 relative to the saw blade 12 when the adjustable miter gauge 100 is coupled to the table saw 10 (shown in FIG. 1). Because the miter bar 108 serves as a rotational guide for the angle of the miter surface 116 relative to the saw blade 12, the miter bar 108 may also be referred to herein as an "adjustable guide."

Figure 5:
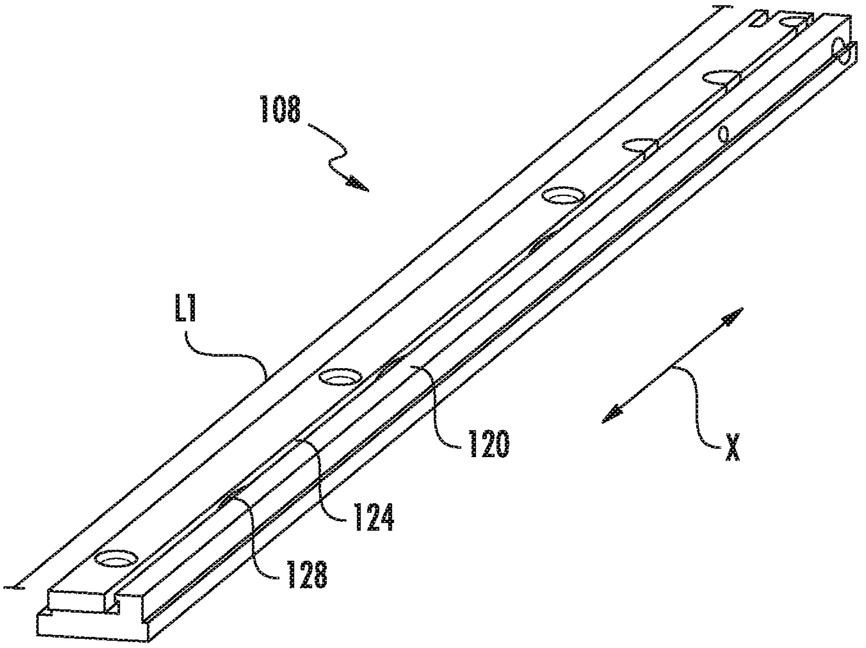
FIG. 5 depicts a perspective view of the miter bar of the adjustable miter gauge of FIG. 4 including a main body, an adjustable body, and a biasing member.
Figure 6A:
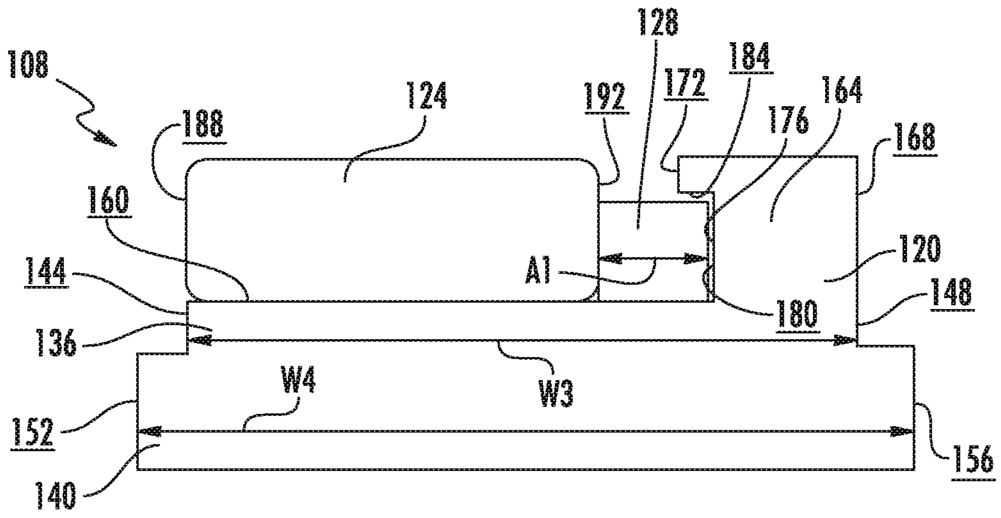
FIG. 6A depicts a front partial view of the miter bar of FIG. 5 in a first position.
Figure 6B:
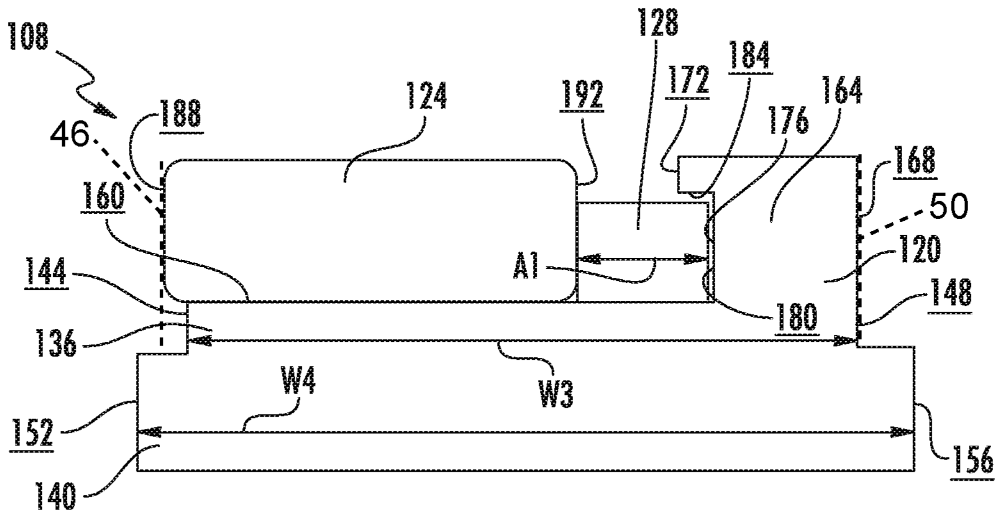
FIG. 6B depicts a front partial view of the miter bar of FIG. 5 in a second position.

As shown in more detail in FIGS. 5, 6A, and 6B, the miter bar 108 of the adjustable miter gauge 100 includes a main body 120, an adjustable body 124, and a deformable biasing member 128. The main body 120 supports the adjustable body 124 and the biasing member 128 such that the main body 120, the adjustable body 124, and the biasing member 128 are configured to be received within the slot 18 (shown in FIGS. 1 and 2).

As shown in FIGS. 6A and 6B, the main body 120 includes a main portion 136 and an engagement portion 140. The main portion 136 includes a first edge surface 144 and a second edge surface 148 arranged opposite and parallel to one another and facing away from one another. The first and second edge surfaces 144, 148 are spaced apart by a third width W3, which is smaller than the distance D1 (shown in FIG. 2) between the first wall 46 and the second wall 50 of the slot 18. The engagement portion 140 includes a third edge surface 152 and a fourth edge surface 156 arranged opposite and parallel to one another and facing away from one another. The third and fourth edge surfaces 152, 156 are spaced apart by a fourth width W4, which is larger than the distance D1 and smaller than the distance D2 (shown in FIG. 2) between the third wall 54 and the fourth wall 58. Accordingly, the main body 120 of the miter bar 108 is sized and configured to matingly engage with the slot 18 so as to be slidable along the longitudinal direction X.

The main body 120 also includes an uppermost surface 160 configured to support the adjustable body 124 and the biasing member 128. The uppermost surface 160 is perpendicular to the first, second, third, and fourth edge surfaces

Figure 1:
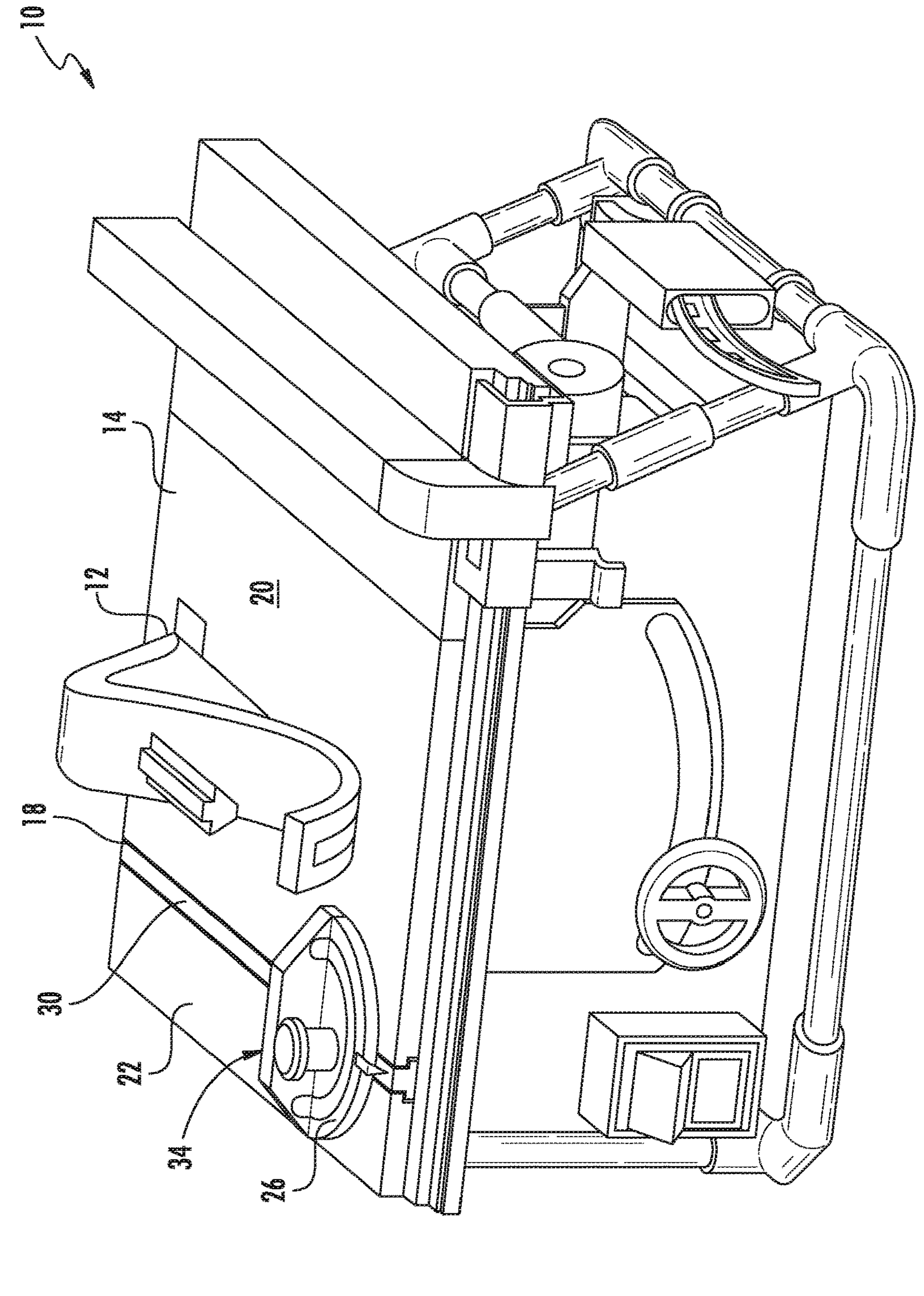
FIG. 1 (PRIOR ART)
FIG. 1 depicts a perspective view of a table saw including a table top and a miter gauge.
Figure 2:
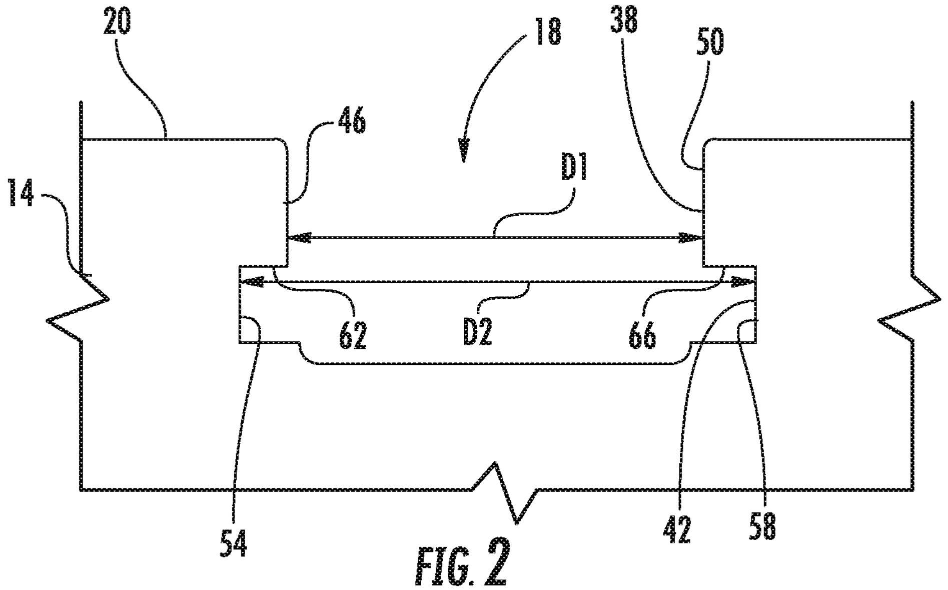
FIG. 2 (PRIOR ART)
FIG. 2 depicts a front partial view of a slot formed in the table top of the table saw shown in FIG. 1.
Figure 3:
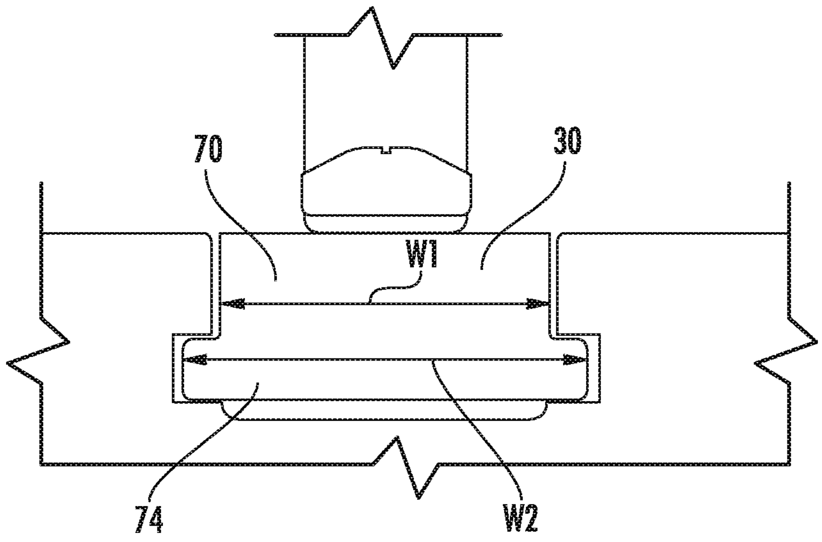
FIG. 3 (PRIOR ART)
FIG. 3 depicts a front partial view of a miter bar of the miter gauge of FIG. 1 received within the slot shown in FIG. 2.

144, 148, 152, 156, and is parallel to the work surface 20 of the table saw 10 when the miter bar 108 is received within the slot 18 (shown in FIG. 1).

The main body 120 also includes an arm 164, which extends above the uppermost surface 160. The arm 164 includes an outwardly facing surface 168, which is coextensive with the second edge surface 148 of the main portion 136, and an inwardly facing surface 172, which is parallel to the outwardly facing surface 168 and faces in the opposite direction. The arm 164 further includes a notch 176 formed in the inwardly facing surface 172. The notch 176 includes an arm support surface 180, which is parallel to the inwardly facing surface 172 and faces in the same direction. The notch 176 also includes a retaining surface 184 which extends between the arm support surface 180 and the inwardly facing surface 172 and is perpendicular to the arm support surface 180 and the inwardly facing surface 172. The notch 176 is configured to receive a portion of the biasing member 128 such that the portion of the biasing member 128 is retained in the notch 176 by the arm support surface 180 and the retaining surface 184.

The adjustable body 124 is generally shaped as a rectangular prism extending along substantially the entire length L1 of the miter bar 108. The adjustable body 124 is configured to rest on the uppermost surface 160 of the main portion 136 and is spaced apart from the arm 164. As explained in more detail below, the adjustable body 124 is slidable along the uppermost surface 160 of the main body 120, in a direction toward and away from the arm 164, between the first and second positions. Thus, the adjustable body 124 is slidable in a direction perpendicular to the longitudinal direction X (shown in FIGS. 4 and 5). As explained in more detail below, the adjustable body 124 is not slidable in a direction parallel to the longitudinal direction X.

The adjustable body 124 includes a first side surface 188 and a second side surface 192 arranged opposite and parallel to one another and extending along substantially the entire length L1 of the miter bar 108. The first and second side surfaces 188, 192 are parallel to the first and second edge surfaces 144, 148 of the main body 120. The first side surface 188 faces in the same direction as the first edge surface 144 and the second side surface 192 faces toward the inwardly facing surface 172 of the arm 164.

When the adjustable body 124 is in the first position, as shown in FIG. 6A, the first side surface 188 is substantially coplanar with the first edge surface 144. In contrast, when the adjustable body 124 is in the second position, as shown in FIG. 6B, the first side surface 188 is not substantially coplanar with the first edge surface 144. Instead, when the adjustable body 124 is in the second position, the first side surface 188 of the adjustable body 124 is spaced farther from the second edge surface 148 of the main portion 136 than the third width W3. In other words, when the adjustable body 124 is in the second position, the first side surface 188 of the adjustable body 124 is farther from the second edge surface 148 than the first edge surface 144 is from the second edge surface 148.

Figure 7:
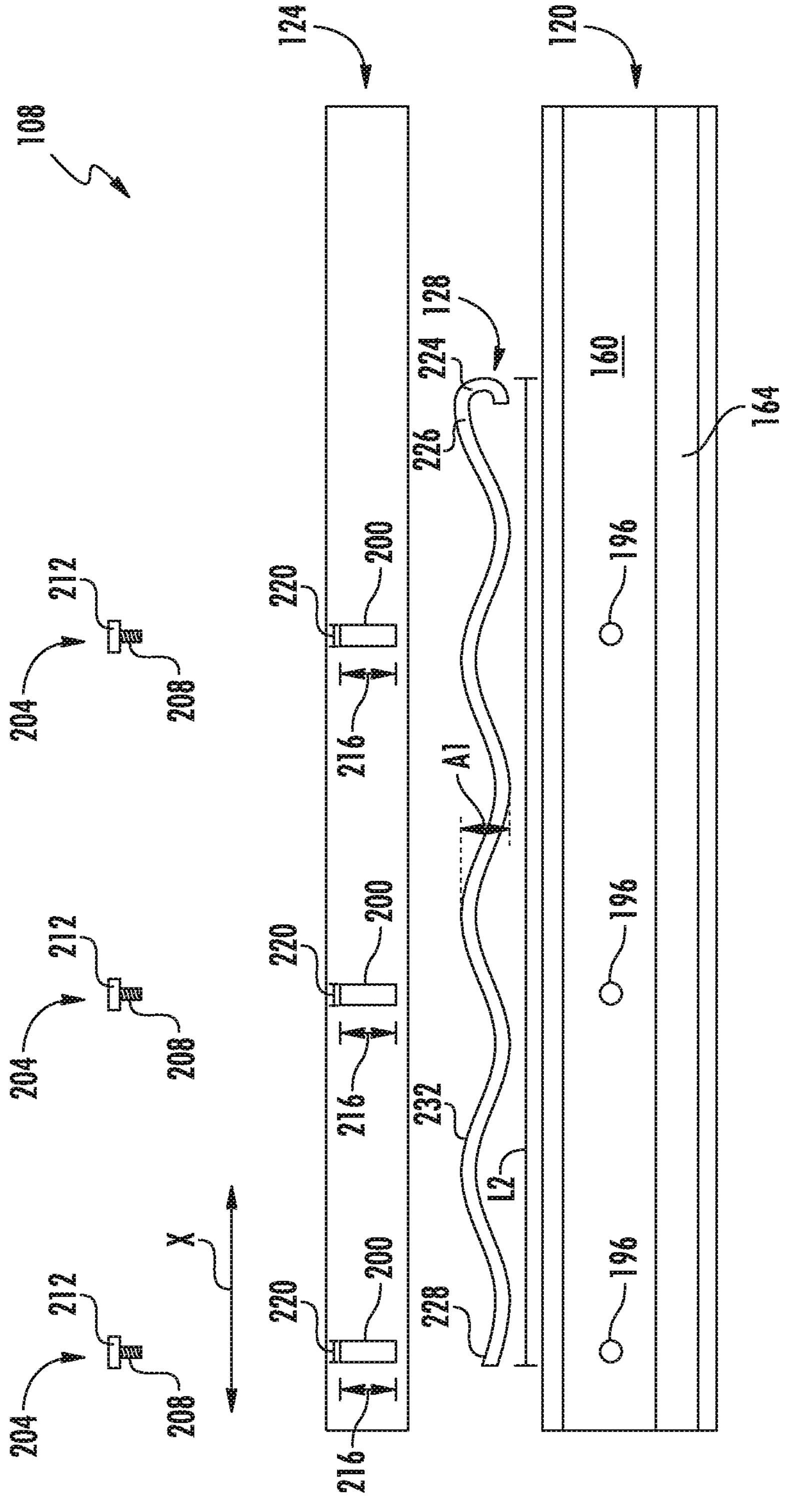
FIG. 7 depicts an exploded view of the miter bar of the adjustable miter gauge of FIG. 4.

Turning now to FIG. 7, the main body 120 includes a plurality of first fastener openings 196 formed in the uppermost surface 160. Similarly, the adjustable body 124 includes a plurality of second fastener openings 200, each of which corresponds to a respective first fastener opening 196. The adjustable miter gauge 100 also includes a plurality of fasteners 204, each of which corresponds to a respective first fastener opening 196 and second fastener opening 200. When the adjustable body 124 is resting on the uppermost surface 160 of the main body 120 (as shown in FIG. 5), the second fastener openings 200 overlap with the first fastener openings 196 such that the fasteners 204 can be inserted through the second fastener openings 200 and into the first fastener openings 196.

Each of the fasteners 204 includes a body 208 and a head 212. The body 208 and head 212 are sized such that the body 208 is able to pass through the respective second fastener opening 200 but the head 212 is not able to pass through the respective second fastener opening 200. The body 208 of each of the fasteners 204 is threaded, and each of the first fastener openings 196 is complementarily threaded to enable each of the bodies 208 to threadably engage with the respective first fastener opening 196. Each of the second fastener openings 200 is oblong or rectangular in shape and includes a longer dimension 216, which is perpendicular to the longitudinal direction X of the miter bar 108, and a shorter dimension 220, which is parallel to the longitudinal direction X of the miter bar 108. The longer and shorter dimensions 216, 220 of each of the second fastener openings 200 are larger than the body 208 to enable the body 208 of each of the fasteners 204 to slide relative to the adjustable body 124. The longer dimension 216 of each of the second fastener openings 200 is larger than the shorter dimension 220 such that the body 208 is able to slide along the longer dimension 216 but not along the shorter dimension 220. In other words, the second fastener openings 200 are configured to enable relative sliding movement between the adjustable body 124 and the fasteners 204 in the direction perpendicular to the longitudinal direction X but not in the direction parallel to the longitudinal direction X.

When the miter bar 108 is assembled, and the adjustable body 124 is resting on the uppermost surface 160 of the main body 120, the bodies 208 of the fasteners 204 are inserted through the second fastener openings 200 in the adjustable body 124 and are threadably engaged with the complementarily threaded first fastener openings 196 in the main body 120. Thus, the fasteners 204 are positionally fixed relative to the main body 120, but the adjustable body 124 is able to slide along the fasteners 204 because the second fastener openings 200 can slide along the bodies 208. By sliding along the fasteners 204, which are positionally fixed relative to the main body 120, the adjustable body 124 is slidable relative to the main body 120. The sliding movement of the adjustable body 124 relative to the main body 120 enables the adjustable body 124 to move between the first position (shown in FIG. 6A) and the second position (shown in FIG. 6B). When the adjustable body 124 is in a desired position relative to the main body 120, threading the body 208 of the fastener 204 further into the first fastener opening 196 brings the head 212 into contact with the adjustable body 124 to positionally lock the adjustable body 124 relative to the main body 120 via pressure. To adjust the position of the adjustable body 124 relative to the main body 120, partially unthreading the body 208 of the fastener 204 from the first fastener opening 196 removes the head 212 from contact with the adjustable body 124 and releases the pressure which was positionally locking the adjustable body 124 relative to the main body 120.

As shown in FIGS. 6A and 6B, the biasing member 128 is configured to rest on the second side surface 192 of the adjustable body 124 and the inwardly facing surface 172 of the main body 120 and to bias the second side surface 192 away from the inwardly facing surface 172. As shown in FIG. 7, the biasing member 128 is a wave spring including a hook 224, which is formed at a hook end 226, and a free end 228, which is separated from the hook end 226 by a length L2 of the biasing member 128. The biasing member 128 includes a plurality of curves 232 along the length L2 and is deformable by compressing the curves 232 to straighten the biasing member 128. When the wave spring of the biasing member 128 is at rest, the curves 232 have an amplitude A1. Compressing the curves 232 of the biasing member 128 decreases the amplitude A1, which increases the length L2. When compression is removed from the biasing member 128, the amplitude A1 of the curves 232 increases, which decreases the length L2. The length L2 is always greater than 50% of the length L1 of the miter bar 108 (shown in FIG. 5).

As shown in FIG. 6A, when the adjustment body 124 is in the first position, the biasing member 128 is compressed between the second side surface 192 of the adjustment body 124 and the arm support surface 180 of the main body 120. Thus, the amplitude A1 of the biasing member 128 is decreased. As shown in FIG. 6B, when the adjustment body 124 is in the second position, compression of the biasing member 128 between the second side surface 192 of the adjustment body 124 and the arm support surface 180 of the main body 120 is released. Thus, the amplitude A1 of the biasing member 128 is increased. Accordingly, the biasing member 128 is configured to bias the adjustable body 124 into the second position.

Figure 8:
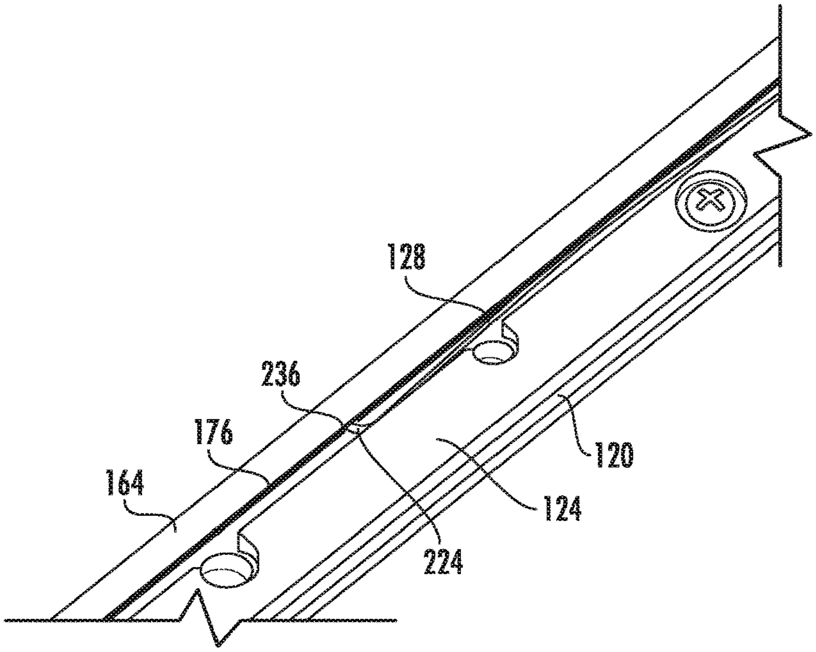
FIG. 8 depicts a partial perspective view of the miter bar of FIG. 5.
Figure 9:
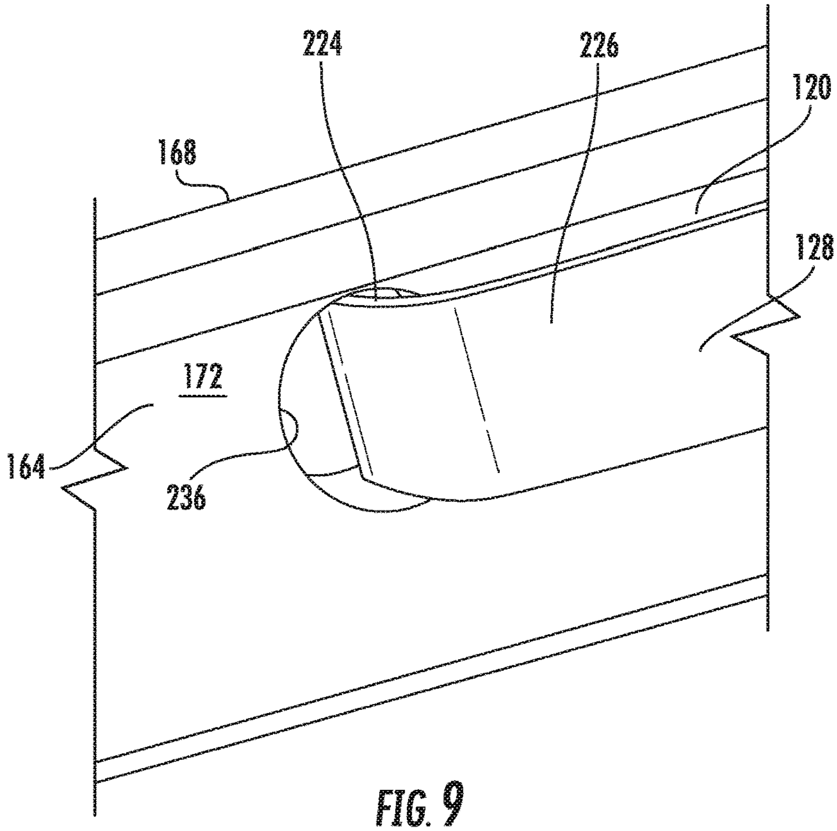
FIG. 9 depicts a partial perspective view of the main body and the biasing member of the miter bar of FIG. 5.

As shown in FIG. 8, the hook 224 of the biasing member 128 is configured to be received in a hook opening 236 formed in the arm support surface 180 of the notch 176 of the arm 164 of the main body 120. As shown in more detail in FIG. 9, the hook opening 236 can extend through the arm 164, through both the inwardly facing surface 172 and the outwardly facing surface 168. However, in alternative embodiments, the hook opening 236 can extend only partially into the arm 164. Engagement of the hook 224 in the hook opening 236 retains the hook end 226 of the biasing member 128 at a fixed position relative to the main body 120. Thus, when the curves 232 of the biasing member 128 are compressed, and the length L2 of the biasing member 128 increases, the free end 228 (shown in FIG. 7) is moved along the longitudinal direction X away from the miter attachment 104. Conversely, when the curves 232 of the biasing member 128 are not compressed, and the length L2 of the biasing member 128 decreases, the free end 228 is moved along the longitudinal direction X toward the miter attachment 104.

In use, the miter gauge 100 is assembled as shown in FIG. 4, and the miter bar 108 is slidably inserted into the slot 18 in the table top 14 of the table saw 10 shown in FIG. 1 such that the adjustable body 124 is substantially flush with the work surface 20 and the support surface 112 of the miter attachment 104 rests on the work surface 20 of the table top 14. Once inserted into the slot 18 (shown in FIG. 2), the miter bar 108 can be adjusted to prevent unwanted movement of the miter gauge 100 relative to the table saw 10 by moving the adjustable body 124 from the first position (shown in FIG. 6A) to the second position (shown in FIG. 6B).

First, the miter bar 108 is inserted into the slot 18 such that the engagement portion 140 is received within the engagement opening 42 and the second edge surface 148 of the main body 120 is in contact with the second wall 50 of the slot 18. Once the miter bar 108 is arranged in the slot 18 in this manner, partially unthreading the bodies 208 of the fasteners 204 from the first fastener openings 196 releases the adjustable body 124 from being held between the heads 212 of the fasteners 204 and the uppermost surface 160 of the main body 120. Once the adjustable body 124 is free to slide along the fasteners 204, the biasing member 128 is released from compression between the second side surface 192 of the adjustable body 124 and the arm support surface 180 of the main body 120. When the compression of the biasing member 128 is released, the amplitude A1 of the curves 232 increases, which forces the adjustable body 124 away from the arm 164. The second fastener openings 200 slide along the fasteners 204 and the adjustable body 124 moves in the direction perpendicular to the longitudinal direction X until the first side surface 188 of the adjustable body 124 contacts the first wall 46 of the slot 18 (shown in FIG. 2) and the adjustable body 124 is in the second position. Once the adjustable body 124 is in the second position, threading the bodies 208 of the fasteners 204 back into the first fastener opening 196 presses the adjustable body 124 between the heads 212 of the fasteners 204 and the uppermost surface 160 of the main body 120 to retain the adjustable body 124 in the second position.

In the event that the main portion 136 of the main body 120 contacts the first wall 46 and the second wall 50 of the main opening 38 of the slot 18, the adjustable body 124 need not be moved from the first position to the second position to prevent unwanted movement of the miter gauge 100 relative to the table saw 10.

The foregoing detailed description of one or more embodiments of the miter gauge for table saw has been presented herein by way of example only and not limitation. It will be recognized that there are advantages to certain individual features and functions described herein that may be obtained without incorporating other features and functions described herein. Moreover, it will be recognized that various alternatives, modifications, variations or improvements of the above-disclosed embodiments and other features and functions, or alternatives thereof, may be desirably combined into many other different embodiments, systems, or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An adjustable guide for a miter gauge configured to be received in a slot formed in a working surface, the slot having a first side wall and a second side wall arranged opposite and parallel to one another, the guide comprising:

a main body having a first edge surface extending substantially parallel to the first and second side walls when the adjustable guide is received in the slot, the first edge surface facing toward a first direction;

an adjustable body having a first side surface extending substantially parallel to the first edge surface and facing toward the first direction, the adjustable body slidably coupled to the main body so as to be slidable between a first position wherein the first side surface is substantially coplanar with the first edge surface and a second position wherein the first side surface is not substantially coplanar with the first edge surface; and a deformable biasing member arranged between the main body and the adjustable body and configured such that deformation of the deformable biasing member causes the deformable biasing member to bias the adjustable body toward the second position.

2. The adjustable guide of claim 1, wherein:

the first edge surface of the main body extends along a longitudinal direction of the adjustable guide; and the adjustable body is slidable in the first direction, which is substantially perpendicular to the longitudinal direction.

3. The adjustable guide of claim 2, wherein the adjustable body is not slidable in a direction substantially parallel to the longitudinal direction.

4. The adjustable guide of claim 2, wherein:

the main body has a main body length extending in the longitudinal direction;

the biasing member has a biasing member length extending in the longitudinal direction; and the biasing member length is at least 50% of the main body length when the adjustable body is in the first position and the second position.

5. The adjustable guide of claim 4, wherein the biasing member length is greater when the adjustable body is in the first position than when the adjustable body is in the second position.

6. The adjustable guide of claim 1, wherein:

the main body includes an uppermost surface arranged perpendicularly to the first edge surface; and the uppermost surface is configured to support the adjustable body and the biasing member.

7. The adjustable guide of claim 6, wherein:

the main body further includes an arm extending from the uppermost surface; and the biasing member is arranged between the arm and the adjustable body.

8. The adjustable guide of claim 7, wherein:

the arm includes a support surface arranged substantially parallel to the first edge surface; and the biasing member is arranged between the support surface and the adjustable body.

9. The adjustable guide of claim 8, wherein the support surface includes an opening configured to receive an end of the biasing member such that the end of the biasing member is positionally fixed.

10. The adjustable guide of claim 6, wherein:

the uppermost surface includes a plurality of first fastener openings; and the adjustable body includes a plurality of second fastener openings configured such that each second fastener opening overlaps with a respective first fastener opening when the adjustable body is in the first position and the second position.

11. The adjustable guide of claim 10, further comprising:

a plurality of fasteners, each fastener corresponding to a respective first fastener opening and second fastener opening, wherein each fastener is configured to be slidably received through the respective second fastener opening, wherein each first fastener opening includes a threaded portion, and wherein each fastener includes a mating threaded portion configured to be matingly threadably received in the threaded portion of the respective first fastener opening.

12. An adjustable miter gauge for use with a table saw, the table saw having a working surface and a slot formed in the working surface, the slot having a first side wall and a second side wall arranged opposite one another, the adjustable miter gauge comprising:

a miter attachment having a substantially planar support surface configured to rest on the working surface of the table saw;

an adjustable guide bar rotatably coupled to the support surface of the miter attachment and configured to be received in the slot formed in the working surface of the table saw, the adjustable guide bar including:

a main body having a first edge surface and a second edge surface arranged opposite one another and substantially perpendicular to the support surface, the first edge surface facing toward a first direction and the second edge surface facing toward a second opposite direction;

an adjustable body having a first side surface extending substantially parallel to the first and second edge surfaces and facing toward the first direction, the adjustable body slidably coupled to the main body so as to be slidable between a first position wherein the first side surface is substantially coplanar with the first edge surface and a second position wherein the first side surface is not substantially coplanar with the first edge surface; and a deformable biasing member arranged between the main body and the adjustable body and configured such that deformation of the deformable biasing member causes the deformable biasing member to bias the adjustable body toward the second position.

13. The adjustable miter gauge of claim 12, wherein:

the second edge surface is configured to rest against the second side wall of the slot when the adjustable guide bar is received in the slot; and the first side surface is configured to rest against the first side wall of the slot when the adjustable guide bar is received in the slot.

14. The adjustable miter gauge of claim 13, wherein:

when the adjustable body is in the second position, the first side surface rests against the first side wall of the slot and the first edge surface does not rest against the first side wall of the slot when the adjustable guide bar is received in the slot.

15. The adjustable miter gauge of claim 12, wherein the adjustable body is slidable in the first direction, which is substantially perpendicular to the first and second edge surfaces.

16. The adjustable miter gauge of claim 12, wherein the adjustable body is not slidable in a direction substantially parallel to the first and second edge surfaces.

17. The adjustable miter gauge of claim 12, wherein:

the main body has a main body length extending in a direction parallel to the first and second side edge surfaces;

the biasing member has a biasing member length extending in a direction parallel to the first and second edge surfaces; and the biasing member length is at least 50% of the main body length when the adjustable body is in the first position and the second position.

18. The adjustable miter gauge of claim 17, wherein the biasing member length is greater when the adjustable body is in the first position than when the adjustable body is in the second position.

19. The adjustable miter gauge of claim 12, wherein:

the main body includes an uppermost surface arranged parallel to the support surface; and the uppermost surface is configured to support the adjustable body and the biasing member.

20. The adjustable miter gauge of claim 19, wherein:

the main body further includes an arm extending from the uppermost surface; and the biasing member is arranged between the arm and the adjustable body.

* * * * *